(12) United States Patent
Thompson et al.

(10) Patent No.: US 10,498,857 B2
(45) Date of Patent: Dec. 3, 2019

(54) SYSTEM INTERACTION MONITORING AND COMPONENT SCALING

(71) Applicant: Amazon Technologies, Inc., Seattle, WA (US)

(72) Inventors: Jonathan Paul Thompson, Seattle, WA (US); Ryan Paul Green, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 455 days.

(21) Appl. No.: 15/084,436

(22) Filed: Mar. 29, 2016

(65) Prior Publication Data

US 2017/0289307 A1 Oct. 5, 2017

(51) Int. Cl.
*H04L 29/08* (2006.01)
*H04L 12/24* (2006.01)
*G06F 9/50* (2006.01)

(52) U.S. Cl.
CPC ............ *H04L 67/327* (2013.01); *G06F 9/505* (2013.01); *G06F 9/5038* (2013.01); *H04L 41/0823* (2013.01)

(58) Field of Classification Search
CPC ... H04L 67/327; H04L 67/2804; H04L 45/22; H04L 41/0823; G06F 9/5038; G06F 9/942
USPC ................................................. 709/224, 226
See application file for complete search history.

(56) References Cited

U.S. PATENT DOCUMENTS

| 7,814,226 B2* | 10/2010 | Patrick | H04L 41/145 370/351 |
| 8,719,919 B2* | 5/2014 | Rice | H04L 67/16 726/1 |
| 9,369,307 B2* | 6/2016 | Rice | H04L 12/66 |
| 9,503,228 B2* | 11/2016 | Subhedar | H04L 1/24 |
| 2008/0215752 A1* | 9/2008 | Che | H04L 29/12113 709/238 |
| 2013/0174146 A1* | 7/2013 | Dasgupta | G06F 9/5072 718/1 |
| 2014/0032768 A1* | 1/2014 | Ding | G06F 9/505 709/226 |

(Continued)

FOREIGN PATENT DOCUMENTS

| EP | 3 035 619 | 6/2016 | |
| EP | 3035619 A1 * | 6/2016 | ........... H04L 12/931 |

*Primary Examiner* — Michael C Lai
(74) *Attorney, Agent, or Firm* — Thorpe North & Western, LLP.

(57) ABSTRACT

A technology is described for monitoring interaction events and scaling services based in part on an impact of the interaction events. An example method may include receiving metadata describing interaction events taking place at services included in a group of services executing in a computing service environment. The metadata may be analyzed to identify a first interaction load for a first service included in the group of services that may result in impacting a second interaction load for a second service included in the group of services. The second service may be notified of the impending impact on the second interaction load resulting from the first interaction load, and the second service may scale the number of second service instances for the second service in anticipation of the impending impact on the second interaction load.

20 Claims, 9 Drawing Sheets

(56) References Cited

U.S. PATENT DOCUMENTS

2014/0237108 A1\* 8/2014 Kurabayashi ........... H04L 41/24
                                                  709/224
2017/0134287 A1\* 5/2017 Shaw .................... H04L 47/125
2017/0323472 A1\* 11/2017 Barnes ............... H04N 5/23206
2017/0366433 A1\* 12/2017 Raleigh .............. H04L 67/2804

\* cited by examiner

SYSTEM INTERACTION MONITORING AND COMPONENT SCALING

BACKGROUND

The advent of virtualization technologies for computing resources has provided benefits with respect to managing large-scale computing resources used to execute services that are accessible to applications and other services executing on various platforms. For example, virtualization technologies may allow a single physical computing machine to host multiple services executing on computing instances and/or software containers using a hypervisor. For example, each computing instance may be a guest machine acting as a distinct logical computing system that executes an application or service executing on a computing instance with the perception that the service is the sole occupier of a given virtualized hardware computing resource.

Application Program Interfaces (APIs) are defined interfaces that allow applications to communicate with services and access enterprise assets, as well as allow services to communicate with other services. An API may be defined as a set of resources and methods. Developers can create an API to access data, business logic, or functionality from services executing within a computing service environment. An API gateway may be a managed service that allows devices and applications to connect to hosted services providing business or other services.

DETAILED DESCRIPTION

Figure 1:
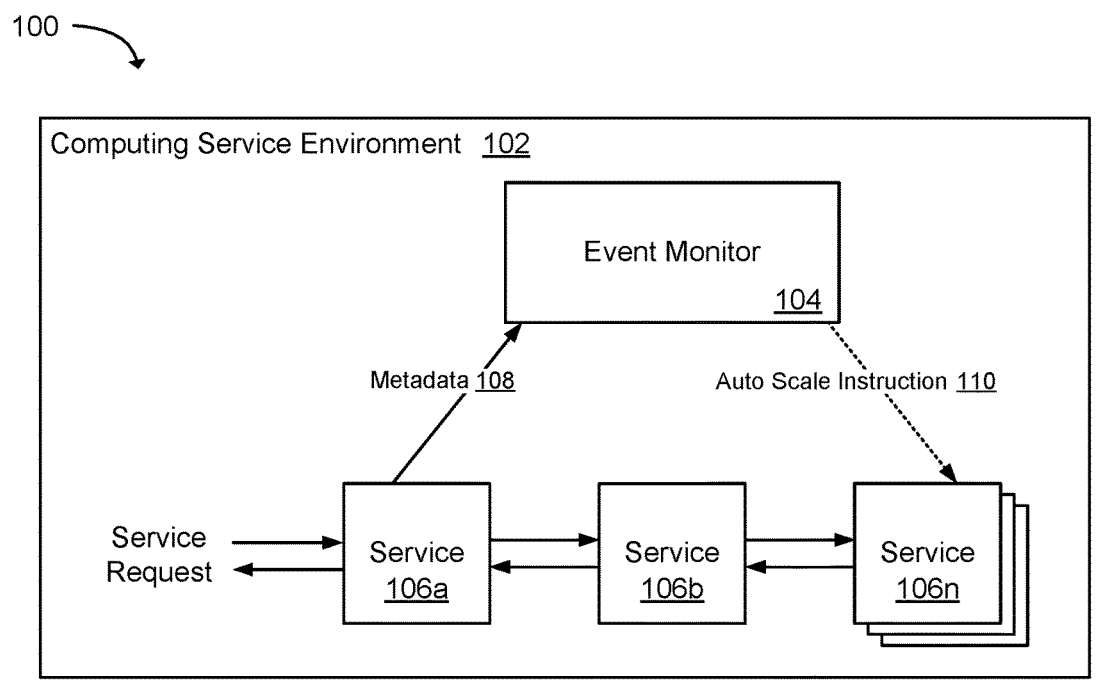
FIG. 1 is a block diagram illustrating an example system for monitoring interaction events at services and instructing a service to scale a number of service instances as a result of a change in an interaction load of an indirectly associated service.

A technology is described for monitoring interaction events associated with a service (or services) executing within a computing service environment and scaling one or more indirectly linked services based in part on the interaction events. In one example, interaction events may include API request events, HTTP (Hypertext Transfer Protocol) request events, remote procedure call events, packet communication events, etc. Interaction events associated with the service may be monitored via metadata describing the interaction events and the metadata may be evaluated to determine an impact of the interaction events on indirectly linked services. A number of instances of the service or a computing capacity of the service may be scaled up or down according to an estimate of how the service may be impacted by the interaction events. Illustratively, the services may provide customer business functions, end point services, and gateway services.

In one example, interaction events may be observed via metadata that describes the interaction events occurring at the services. For example, after an API request is received at a service, metadata may be generated that describes the API request and the metadata may be provided to an event monitor. The event monitor may be configured to analyze the metadata and identify routing patterns associated with routing the API requests to and from the services included in the computing service environment. Interactions between the services may be identified by analyzing the routing patterns. For example, analysis of the routing patterns may show which services depend on other services to fulfill an API request. As such, a chain of service dependencies may be discovered that may be used in determining an impact of a first service's API request load on a second service that is indirectly linked to the first service. As an illustration, analysis of API routing patterns may show that service A makes API requests to service B, which in response to the API request makes an API request to service C. As a result, service A is indirectly linked to service C, and an API request load on service A may impact an API request load of service C. After indirect links between services have been identified, API request loads for services that impact indirectly linked services may be monitored to detect changes in the API request loads that may cause the indirectly linked services to scale up or down (i.e., increase or decrease a number of service instances included in a service). For example, an API request load for a service within an API gateway may be monitored for changes in the API request load that may cause an API request load of an indirectly linked end point service to increase or decrease, resulting in scaling of the end point service. In the event that a determination is made that a change in a service's API request load may impact an indirectly linked service, the API event monitor may be configured to notify the indirectly linked service of the potential impact and the indirectly linked service may be scaled in anticipation of an increase or decrease in API requests at the indirectly linked service.

FIG. 1 is a block diagram illustrating a high level example of a system 100 for monitoring interaction events associated with a service 106a executing in a computing service environment 102 and instructing a service 106n to scale a number of service instances included in the service 106n, or scale the computing capacity of the service 106n as a result of a change in a service request load for service 106a. As illustrated, the computing service environment 102 hosts a number of services 106a-n and an event monitor 104. The services 106a-n, for example, may be federated services or micro-services. A federated service may be an autonomous service that is interconnected via a computer network to other autonomous services by way of one or more service gateways, and a micro-service may be a narrowly focused independently deployable service configured to execute a single task in response to a service request.

A service 106*a-n* may be configured to provide business functions, computing functions, data functions, and/or end services to applications and devices via service requests routed to the services 106*a-n*. Also, a service 106*a-n* may be configured as a gateway having a defined interface that allows applications, devices, and other services to communicate with the services 106*a-n* and access computing assets included in the computing service environment 102. In one example, service requests may be made using an API. An API may be defined for a service 106*a-n* as a set of resources and methods that are available to applications, devices, and other services via the API. As an illustration, an application or device may request a resource from the service 106*a-n* or request that the service 106*a-n* perform a method via the API. The services 106*a-n* may be scaled according to an API request load for the other services 106*a-n*. For example, a service 106*a-n* may include one or more service instances (e.g., a computing instance executing an instance of a service 106*a-n*, or a software container executing an instance of a service 106*a-n*) that may be scaled up or down according to the service's API request load.

In addition to receiving service requests from applications and devices, the services 106*a-n* may be configured to interact with each other via service requests. For example, in fulfilling a request, a first service 106*a* may be configured to make a service request to a second service 106*b*, which in turn may make a service request to an Nth service 106*n*. As a more specific example, a first service 106*a* may be configured to process orders for items, a second service 106*b* may be configured to verify item inventories, and an Nth service 106*n* may be an item inventory data store (e.g., an endpoint service). In receiving an item order, the first service 106*a* makes a service request to the second service 106*b* to determine whether the item is in stock. The second service 106*b* then makes an API request to the Nth service 106*n* querying the item inventory data store for a current item inventory. The Nth service 106*n* then returns the current item inventory to the second service 106*b*, who then notifies the first service 106*a* that the item is either in-stock or out-of-stock.

Figure 4:
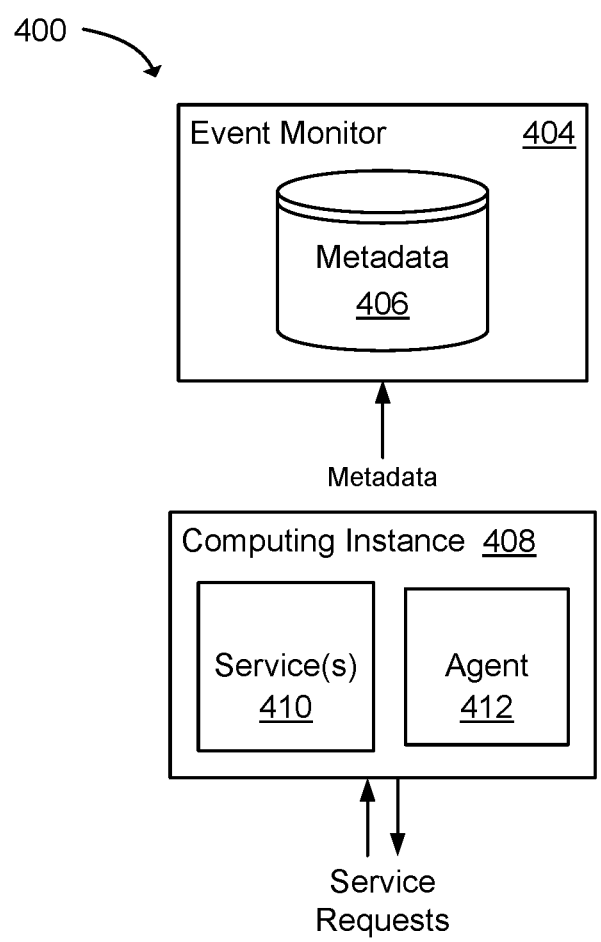
FIG. 4 is a block diagram illustrating an example system for generating metadata using an agent in association with interaction events at a service.
Figure 5:
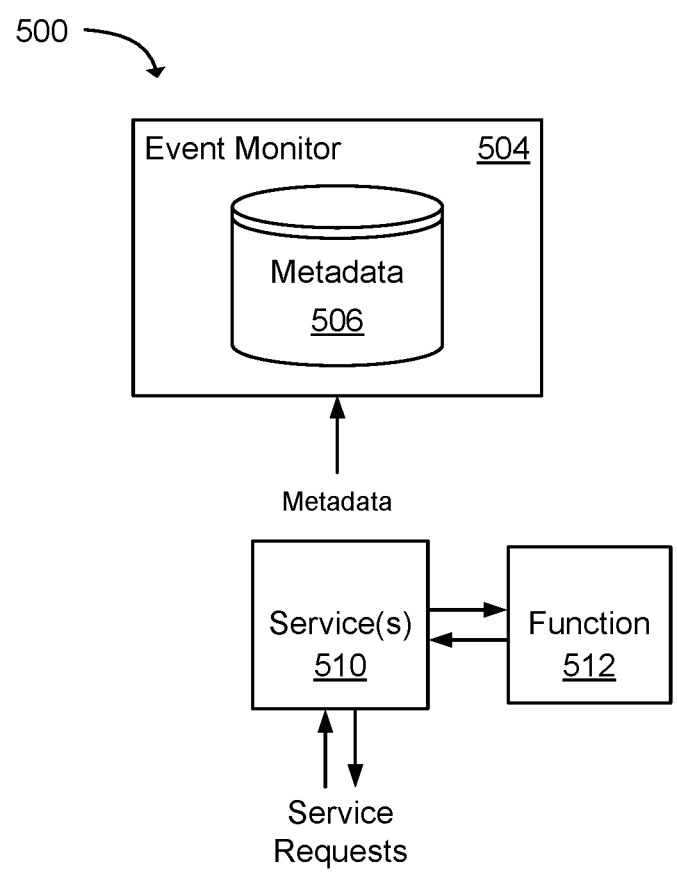
FIG. 5 is a block diagram that illustrates an example system for generating metadata using a function in association with interaction events at a service.

As described in greater detail in association with FIGS. 4 and 5, metadata 108 describing API requests made and received by the services 106*a-n* may be generated and the metadata 108 may be provided to the event monitor 104, which may be configured to collect the metadata 108 and generate a routing map using the metadata 108. The routing map may provide details about the API requests transmitted within the system 100. The event monitor 104 may be configured to analyze the routing map and identify routing patterns associated with routing API requests to the services 106*a-n*. The routing patterns may be analyzed to determine relationships between the services 106*a-n*. As an illustration, analysis of routing patterns associated with API requests may show that a first service 106*a* may be dependent upon a second service 106*b* and then an Nth service 106*n* to fulfill API requests, thereby forming a dependent API request flow between the services 106*a-n*.

The event monitor 104 may be configured to evaluate a dependent API request flow and identify a first service 106*a* that may be indirectly dependent upon another Nth service 106*n* to fulfill API requests sent to the first service 106*a*. The event monitor 104 may monitor an API request load for the first service 106*a* (e.g., via metadata 108 describing API events at the first service 106*a* and determine whether a change in the API request load for the first service 106*a* impacts an API request load of the Nth service 106*n*. For example, an increase in API requests at the first service 106*a* may result in an increase in API requests at Nth service 106*n* because the first service 106*a* may be indirectly dependent upon the Nth service 106*n* to fulfill API requests received by Nth service 106*n*. More specifically, in response to receiving an API request, a first service 106*a* may make an API request to a second service 106*b*, which in turn may make an API request to an Nth service 106*n*. As the number of API requests received by the first service 106*a* increase and decrease, so may the number of API requests received by the Nth service 106*n*. This relationship between two services or many services may be linear, proportional, exponential, or some other relationship that may be discovered by the Event Monitor 104.

Because services other than the first service 106*a* may be indirectly dependent upon the Nth service 106*n*, any changes in the API request load at the Nth service 106*n* may not be directly proportional to changes in API requests at first service 106*a*. Therefore, the event monitor 104 may be configured to monitor API request loads for each service indirectly dependent upon the Nth service 106*n* and calculate a collective impact on the API request load of the Nth service 106*n*. For example, multiple services indirectly dependent upon the Nth service 106*n* may be monitored and an aggregate API request load for the multiple services may be used to calculate an impact on the API request load of the Nth service 106*n* based in part on the aggregate API request load of the multiple services.

In the event that a determination is made that the Nth service 106*n* may be impacted as a result of a change in the API request load of the first service 106*a* (and other services indirectly dependent on the Nth service 106*n*), the event monitor 104 may be configured, in one example, to send the Nth service 106*n* an auto scale instruction 110, instructing the Nth service 106*n* to scale a number of service instances included in the Nth service 106*n* or to scale a computing capacity for the Nth service 106*n*. In response to receiving the auto scale instruction 110, the Nth service 106*n* may increase or decrease a number of service instances included in the Nth service 106*n*, or scale the computing capacity of the Nth service 106*n*. For example, the auto scale instruction 110 may include instructions for launching or terminating a number of service instances included in the Nth service 106*n*, or may include an estimated API load change value (e.g., a percentage value or volume value) for the API request load of the Nth service 106*n* that may be used by the Nth service 106*n* to calculate a number of service instances to launch or terminate. The Nth service 106*n* may then scale according to the auto scale instruction 110. While FIG. 1 depicts three services 106*a-n*, it will be appreciated that any number of services 106*a-n* may be included in the computing service environment 102.

In the past, techniques used to scale services may have resulted in delayed processing of API requests due to a wait time associated with launching additional service instances, or may have resulted in a disproportionate number of service instances available to handle API requests. As one example, scaling a service in direct response to an increase in API requests may have resulted in a delay in fulfilling the API requests while additional service instances were launched. As another example, scaling of a service based on historical API request load metrics may have resulted in excess service instances or insufficient service instances available to handle API requests. As a result of the current technology, a service indirectly linked to another service (e.g., a service that is down the chain of a dependent API request flow) may be notified of an anticipated change in the service's API request load and may start scaling in anticipation of the change. Thus, the service may receive advance notice of the anticipated change in the service's API request load, allowing the service to start scaling prior to the actual change in the service's API request load.

Figure 2:
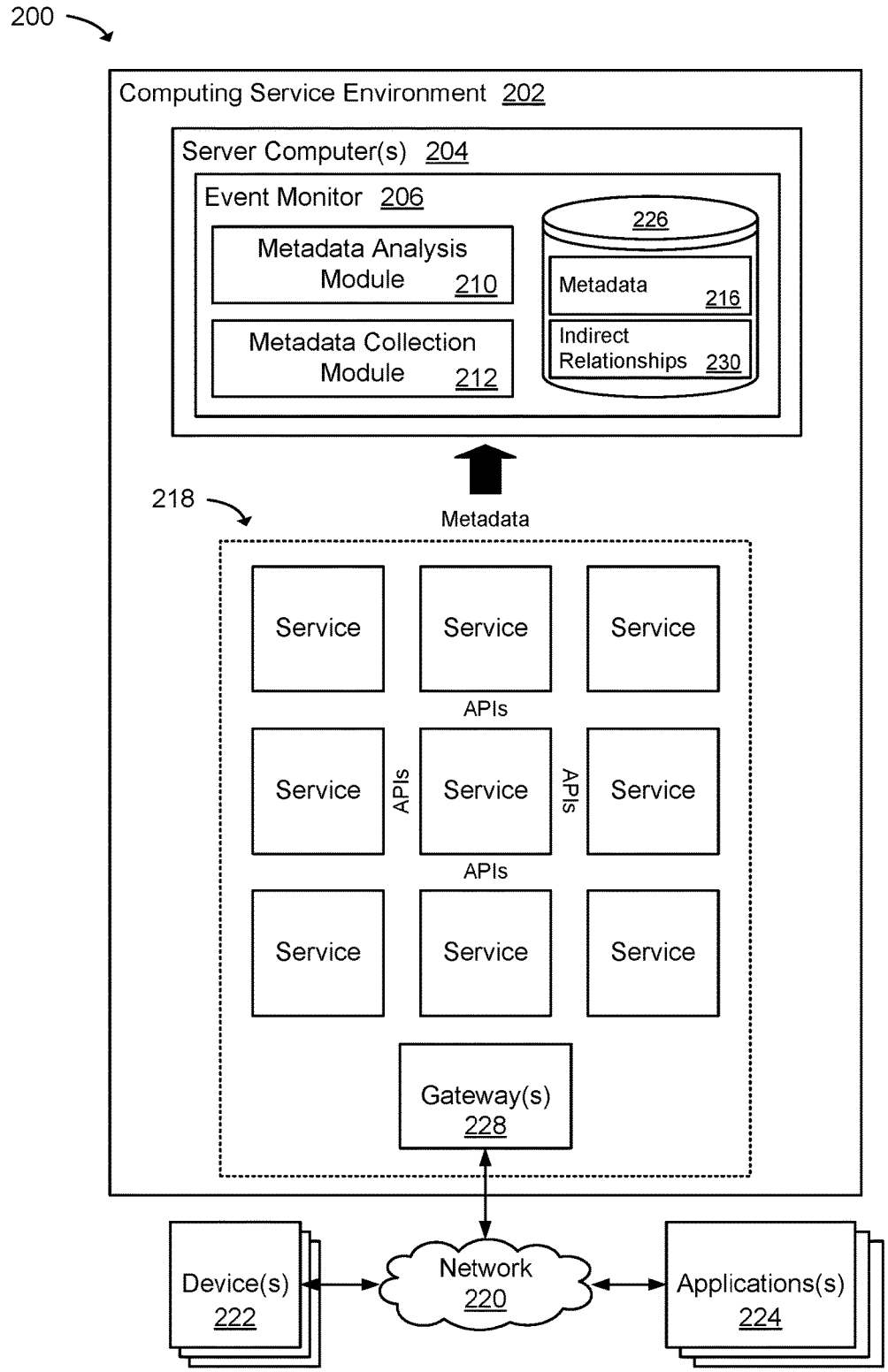
FIG. 2 is a block diagram that illustrates an example system for collecting metadata associated with interaction events at services and identifying indirect relationships between the services.

FIG. 2 is a block diagram that illustrates an example system 200 for collecting metadata 216 associated with interaction events at services 218 (and services within gateways 228) and identifying indirect relationships among the services 218. The system 200 may include a computing service environment 202 having one or more server computers 204 that host an event monitor 206 and services 218 providing business functions and/or end services to applications 224 and devices 222 via service requests routed to the services 218. The computing service environment 202 may include computing resources for executing computing instances (e.g., virtual machines), which may be an instance of a software implementation of a machine (i.e. a computer) that executes applications like a physical machine. The services 218 may be executed using computing instances. For example, a computing instance may be used to host a service 218, or a computing instance may be used to host a software container (e.g., a Docker container) that executes a service 218 (e.g., a micro-service).

Applications 224 and/or devices 222 may be in communication with the services 208 by way of APIs for the services 218. In addition, the services 218 may be in communication with each other via the APIs. As illustrated, service requests (e.g., API requests) made between the services 218 and the devices 222/applications 224 may be routed through a gateway 228. In some examples, each service 218 may be associated with an individual gateway 228 specific to the service 218.

The event monitor 206 may include modules used to collect and analyze metadata 216. For example, the event monitor 206 may include a metadata collection module 212 and a metadata analysis module 210. The metadata collection module 212 may be configured to receive metadata 216 from the services 218 and store the metadata 216 in a data store 226 and/or in computer memory. The metadata 216 may describe API requests received at the services 218 (including services 218 acting as gateways 228).

Metadata 216 may be generated in response to receiving an API request at a service 218. For example, in receiving an API request at a service 218, the API request may be analyzed and metadata 216 may be generated that describes the API request. As a more specific example, metadata may be generated by extracting API request information from the hypertext of the API request. For example, the hypertext of an API request may include an identity (e.g., a URL (Uniform Resource Locator)) of a destination service 218 and API parameters. Additional information related to the API request may be obtained from a gateway 228 or service 218, such as the source of the API request, a status of the API request, a return value for the API request, and the like. The API request information may then be used to generate metadata 216. The metadata 216 may include, but is not limited to, an inbound request identifier (e.g., for a request received at a service 218), outbound request identifier (e.g., a request made by a service 218), a composite identifier (e.g., a composite of identifiers for each hop that an API request made between a source and a destination), timing, status, return value, etc. Examples of systems used to generate metadata 216 in response to receiving or sending an API request at a service 218 or gateway 228 are described below in association with FIGS. 4 and 5. Metadata 216 may be sent to the event monitor 206 and the metadata collection module 212 may be configured to store the metadata 216 to a data store 226 that may be accessible to the metadata analysis module 210.

The metadata analysis module 210 may be configured to analyze metadata 216 and identify indirect API relationships between services 218, as well as indirect API relationships between gateways 228 and services 218. In one example, API request patterns (e.g., patterns for API requests, routes, loads, etc.) may be identified by analyzing metadata 216 and the API request patterns may be used to identify indirect API relationships between services 218. For example, analysis of API request patterns may expose a relationship between a first service that receives API requests and a second service that the first service indirectly depends upon to fulfill the API requests received by the first service. The API request pattern may show that changes in the first service's API request load may have an impact on the second service's API request load. As an illustration, an API request pattern may show that in response to receiving an API request, service A makes an API request to service B, which in turn makes another API request to service C, thereby exposing an indirect relationship between service A and service C. Further, the API request pattern may show that a change (i.e., increase or decrease) in service A's API request load has a corresponding effect on service C's API request load.

In one example, machine learning may be used to analyze metadata 216 and identify API request patterns. The API request patterns may be used to determine how an API request load for a first service (or a group of services) impacts an API request load for an indirectly linked second service. A machine learning model configured to analyze API request patterns may be constructed using metadata 216 collected by the metadata collection module 212. The machine learning model may be used to identify routing patterns associated with API requests routed to the gateway 228 and the services 218, and the routing patterns may be analyzed as part of evaluating API activity within the computing service environment 202. Non-limiting examples of machine learning models that may be used include decision tree models, support-vector machines, naïve Bayes models, random forest models, and the like. The API request patterns may provide an overview of API activity within the computing service environment 202. In some examples, API routing patterns may be generated for individual services 218 and/or gateways 228 and may provide an overview of API activity for an individual service 218 and/or gateway 228.

Analysis of API request patterns may expose associations and interactions between the services 218 that can be used in determining how a service's API request load impacts other service's API request loads. For example, analysis of API request patterns may expose API request interactions between services 218. The API request interactions may include direct API request interactions (e.g., service A calls service B) and indirect API request interactions (e.g., service A calls service B, who then calls service C). Thus, analysis of API request patterns may provide details regarding API request flows among the services 218 and provide details regarding API request loads of services 218 and how changes in an API request load of a first service may affect an API request load of a second service indirectly associated with the first service. As a specific example, API request patterns may show that some specific amount of time after service A's API request load increases, service C's API request load increases as a result of the increase in service A's API request load.

Records for indirect relationships 230 identified via analysis of API request patterns may be stored to a data store 226. For example, an indirect relationship 230 record may identify a first service 218 and identify one or more services 208 that may be indirectly associated with the first service 218 via API requests. The indirect relationship 230 records may be used to identify services 218 to monitor. More specifically, the API request loads of the services 218 may be monitored for changes that may impact the API request loads of indirectly associated services 218 and scaling of the indirectly associated services 218 may be performed based in part on the API request loads of the services 218 being monitored, as described in greater detail below in association with FIG. 3.

The services 218 included in the computing service environment 202 may, in one example, be utilized by network addressable devices 222 included in a network of addressable devices. This "network" is commonly referred to as the Internet of Things (IOT). The devices 222 may be configured to communicate with the services 218, and the services 218 in return may communicate with one another and the devices 222 via the physical network 220 using API requests. Devices 222 in communication with the services 218 may include, but are not limited to, farming equipment, industrial printers, network addressable electronic readers, printers, laptops, watches, light switches, lightbulbs, media players, voice command devices, video cameras, doorbell systems, door locks, smoke alarms, thermostats, security systems, environmental monitor, as well as any other device that may be configured to communicate over a network 220. Also the devices 222 may include client devices such as, but not limited to, a desktop computer, laptop or notebook computer, tablet computer, mainframe computer system, handheld computer, workstation, network computer, or other devices with like capability. Applications 224 in communication with the services 218 may include enterprise applications and services, mobile applications, desktop applications, and the like.

Figure 3:
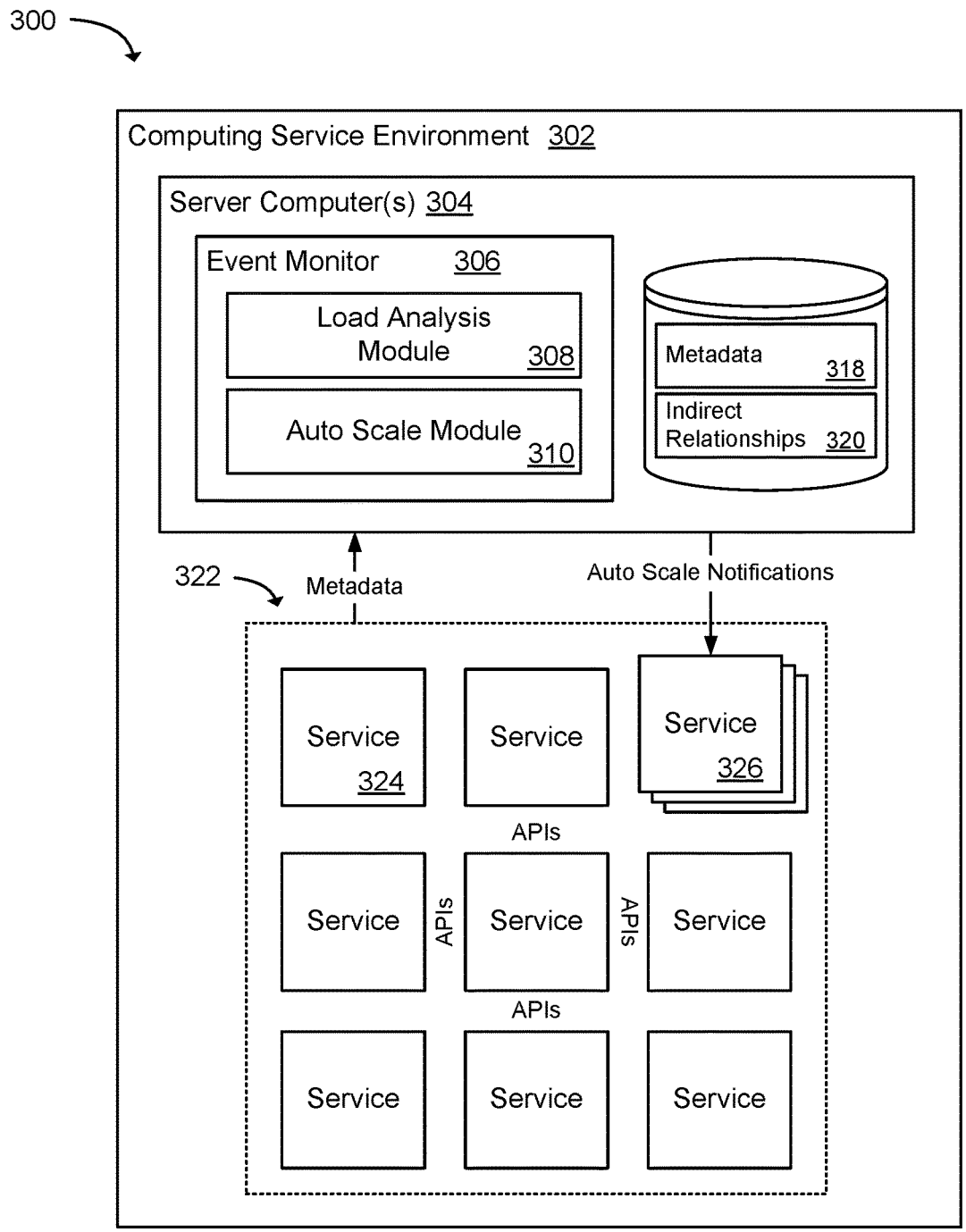
FIG. 3 is a block diagram illustrating an example system for monitoring an interaction load of a service and determining an impact of the interaction load on an indirectly associated service.

Having identified indirect relationships among services as described above, FIG. 3 illustrates an example system 300 for monitoring services having indirect relationships and instructing a service to scale based in part on API request loads of the indirectly dependent services being monitored. More specifically, FIG. 3 illustrates that the system 300 may be configured to monitor API request loads for a first service(s) 324 and determine whether a change in an API request load for the first service 324 impacts an API request load for a second service 326 (as well as other services 322 in a computing service environment 302) that may be indirectly associated with the first service 324. The system 300 may include a server computer 304 that hosts an event monitor 306. The event monitor 306 may include an API load analysis module 308 and an auto scale module 310.

In one example, the API load analysis module 308 may be configured to analyze metadata 318 to identify changes in an API request load of a first service 324 (or multiple services) that may be indicative of an increased API request load on a second service 326 that may be indirectly associated with the first service 324. Indirect relationship 320 records may be used to identify services 322 to monitor for changes in the services' API request loads. The services 322 may send metadata 318 to the event monitor 306 as described in association with FIGS. 4 and 5 below.

Metadata 318 received from a first service 324 being monitored may be analyzed to determine an API request load of the first service 324. More specifically, the metadata 318 may be analyzed to identify API request patterns associated with API events at the first service 324, and the API request patterns may be analyzed to determine the API request load of the first service 324. For example, an estimate of the service's API request load may be made based in part on API request patterns representing an amount of API requests being received at and sent from the first service 324. Any changes in the amount of API requests received and sent at the first service 324 may be analyzed to determine whether the change may have an impact on the second service 326 indirectly associated with the first service 324 that would cause the second service 326 to scale up or down.

In one example, API request patterns for the first service 324 may be analyzed to identify abnormal API request patterns that suggest an anticipated impact on an API request load for the second service 326 indirectly associated with the first service 324. For example, malicious activity at an API gateway or service 322 may result in abnormal API request patterns being detected by the API load analysis module 308. As an illustration, API request patterns indicating a significant increase in API requests being received at the first service 324 may indicate some type of network attack on the first service 324. In identifying an abnormal API request pattern at the first service 324, a potential impact on the second service 326 indirectly associated with the first service 324 may be determined.

In the event that a determination may be made that a change in API activity at the first service 324 may have an anticipated impact on the second service 326 indirectly associated with the first service 324, the auto scale module 310 may, in one example, be configured to notify the second service 326 of an impending impact on the service's API request load. In another example, the auto scale module 310 may be configured to instruct service 326 to scale a number of service instances included in the second service 326.

In one example, an auto scaling notification or auto scaling instruction may be directly sent from the event monitor 306 to the second service 326. Alternatively, a control instruction (e.g., an auto scaling notification or auto scaling instruction) may be appended to an API request (e.g., a Hypertext Transfer Protocol (HTTP) message) received at an API gateway and forwarded to the second service 326, where the auto scaling notification or auto scaling instruction may be read by the second service 326. For example, the event monitor 306 may instruct the API gateway to append the auto scaling notification or auto scaling instruction to the API request addressed to the second service 326.

In response to receiving an auto scaling notification or auto scaling instruction, the second service 326 may scale the number of service instances included in the second service 326 according to the impact on the service's API request load. As a result, the second service 326 may begin scaling service instances in anticipation of an increase or decrease in an API request load for the second service 326. A notification sent to the second service 326 may indicate whether an expected increase or decrease in API requests is expected, or may include information about how much of an increase or decrease may be expected. Likewise, an auto scaling instruction may simply instruct the second service 326 to increase or decrease the number of service instances included in the second service 326 based on a determination made by the second service 326, or may specify a number or percentage of service instances to launch or terminate. In one example, the auto scale module 310 may be configured to calculate a scaling factor that may be based in part on an API request pattern for the first service 324 and provide the scaling factor to the second service 326. For example, an increase or decrease in a service's API request load as represented by an API request pattern may be calculated and used in part to calculate a scaling factor used to increase or decrease a number of service instances included in the second service 326.

In one example, historical metadata can be analyzed to identify API request patterns associated with a first service 324 that resulted in auto scaling of a second service 236. The API request patterns may be used to anticipate increases or decreases in an API request load for the second service 326 and the second service 326 may be auto scaled accordingly.

FIG. 4 is a block diagram illustrating an example of a system 400 for generating metadata 406 in association with API event at a service 410 (including a service 410 acting as an API gateway). As illustrated, a computing instance 408 may host service(s) 410 and a software agent 412 configured to generate metadata 406 in response to API request activity that occurs at the service(s) 410. Metadata 406 generated by the software agent 412 may be sent to the event monitor 404. For example, an API request may be received at the service 410. Upon receiving the API request, the software agent 412 may be configured to analyze the API request and generate metadata 406 that describes the API request. For example, the API request may be parsed to identify parameters in the API request and the identified parameters may be extracted and placed in a metadata tuple. The metadata in the metadata tuple may collectively provide a description of the API request that can be used in combination with other metadata tuples to generate an overview of API activity occurring within a system. Illustratively, metadata 406 may include, but is not limited to, a request identifier, an outbound request identifier, a composite identifier, timing, a status, and/or a return value. The software agent 412 may send the metadata 406 to the event monitor 404, or alternatively, return the metadata 406 to the service 410, which sends the metadata 406 to the event monitor 404.

FIG. 5 is a block diagram illustrating an example system 500 for generating metadata 506 using a function 512. Illustrated is a service(s) 510 (including a service 510 acting as an API gateway) configured to call a function 512 that generates metadata 506 in response to API events that occur at the service 510. Illustratively, the function 512 may be executed using a software container. The service 510 may call the function 512 in response to an API event at the service 510. In calling the function 512, an API request and information related to the API request (e.g., API request source information, timing information, etc.) may be provided to the function 512. The function 512 may be configured to parse the API request and identify components of the API request (e.g., destination service and parameters) and extract the identified components. The components may be used by the function 512 to generate metadata 506 that describes the API request. The function 512 may return the metadata 506 to the service 510, and the service 510 may send the metadata 506 to the event monitor 504. Alternatively, the function 512 may be configured to send the metadata 506 directly to the event monitor 504.

The various processes and/or other functionality contained within the systems depicted in FIGS. 1-5 may be executed on one or more processors that are in communication with one or more memory modules. The systems may include a number of computing devices that are arranged, for example, in one or more server banks or computer banks or other arrangements. The computing devices may support a computing environment using hypervisors, virtual machine monitors (VMMs) and other virtualization software.

The systems may include one or more data stores. Illustratively, the data stores may store API request metadata and indirect API relationship records. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API requests, procedure calls or other network commands that may be made in relation to the modules and services included in a computing service environment may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

API requests may be transmitted over a physical network and a virtualized network. A virtualized network may provide network communication between computing instances hosted on a single server computer. The physical network may include any useful computing network, including an intranet, the Internet, a local area network, a wide area network, a wireless data network, or any other such network or combination thereof. Components utilized for such a system may depend at least in part upon the type of network and/or environment selected. Communication over the physical network may be enabled by wired or wireless connections and combinations thereof.

FIGS. 1-5 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIGS. 1-5 illustrate example systems that may implement the techniques above, many other similar or different environments are possible. The example environments discussed and illustrated above are merely representative and not limiting.

Figure 6:
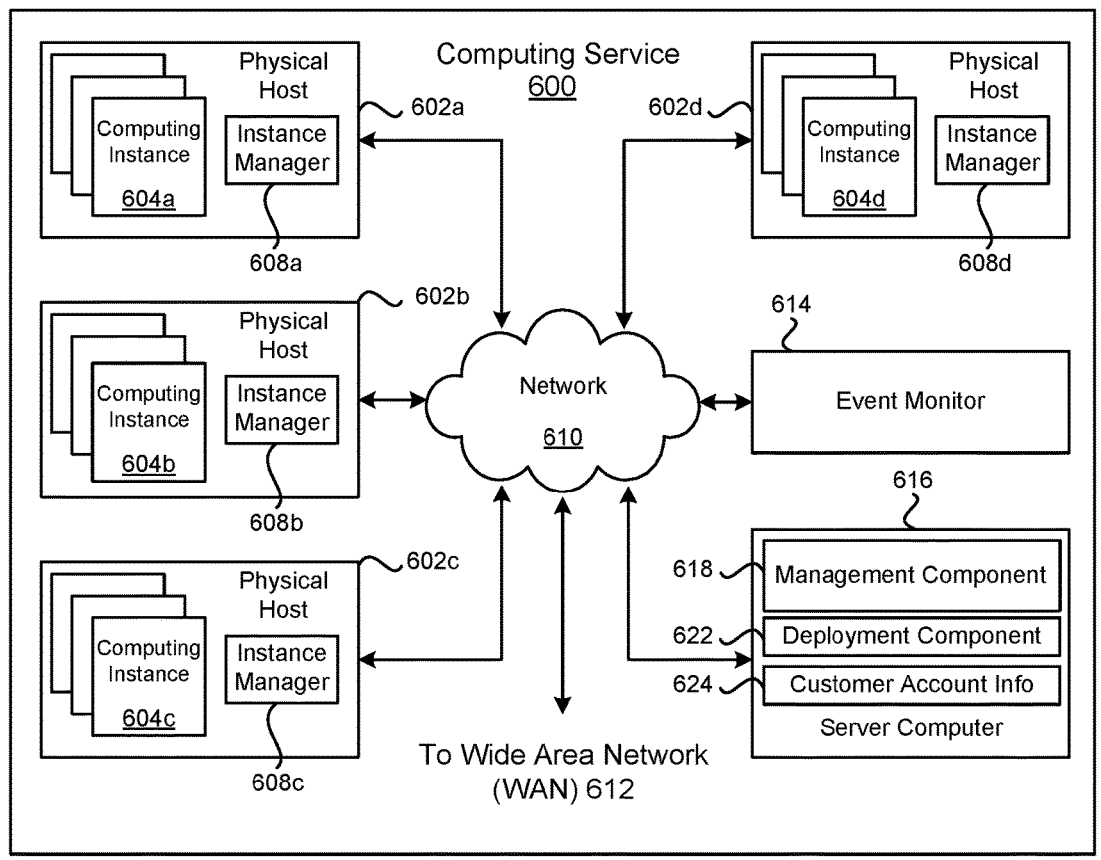
FIG. 6 is a block diagram that illustrates an example computing service environment that includes an event monitor.

Moving now to FIG. 6, a block diagram illustrates an example computing service 600 that may be used to execute and manage a number of computing instances 604*a-d*. In particular, the computing service 600 depicted illustrates one environment in which the technology described herein may be used. The computing service 600 may be one type of environment that includes various virtualized service resources that may be used, for instance, to host computing instances 604*a-d*.

The computing service 600 may be capable of delivery of computing, storage and networking capacity as a software service to a community of end recipients. In one example, the computing service 600 may be established for an organization by or on behalf of the organization. That is, the computing service 600 may offer a "private cloud environment." In another example, the computing service 600 may support a multi-tenant environment, wherein a plurality of customers may operate independently (i.e., a public cloud environment). Generally speaking, the computing service 600 may provide the following models: Infrastructure as a Service ("IaaS"), Platform as a Service ("PaaS"), and/or Software as a Service ("SaaS"). Other models may be provided. For the IaaS model, the computing service 600 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 600. End customers may access the computing service 600 using networked client devices, such as desktop computers, laptops, tablets, smartphones, etc. running web browsers or other lightweight client applications, for example. Those familiar with the art will recognize that the computing service 500 may be described as a "cloud" environment.

The particularly illustrated computing service 600 may include a plurality of server computers 602*a-d*. While four server computers are shown, any number may be used, and large data centers may include thousands of server computers. The computing service 600 may provide computing resources for executing computing instances 604*a-d*. Computing instances 604*a-d* may, for example, be virtual machines. A virtual machine may be an instance of a software implementation of a machine (i.e. a computer) that executes applications like a physical machine. In the example of a virtual machine, each of the server computers 602*a-d* may be configured to execute an instance manager 608*a-d* capable of executing the instances. The instance manager 608*a-d* may be a hypervisor, virtual machine monitor (VMM), or another type of program configured to enable the execution of multiple computing instances 604*a-d* on a single server. Additionally, each of the computing instances 604*a-d* may be configured to execute one or more applications.

One or more server computers 614 and 616 may be reserved to execute software components for managing the operation of the computing service 600 and the computing instances 604*a-d*. For example, a server computer 614 may execute an event monitor configured to collect metadata for service requests made to gateways and services executing on the computing instances 604*a-d* hosted by the physical hosts 602*a-d*. The event monitor may be configured to analyze interaction events associated with the gateways and services and determine whether the interaction events may impact the interaction loads (e.g., service request loads) of other services that may be indirectly associated with the gateways and services.

A server computer 616 may execute a management component 618. A customer may access the management component 618 to configure various aspects of the operation of the computing instances 604*a-d* purchased by a customer. For example, the customer may setup computing instances 604*a-d* and make changes to the configuration of the computing instances 604*a-d*.

A deployment component 622 may be used to assist customers in the deployment of computing instances 604*a-d*. The deployment component 622 may have access to account information associated with the computing instances 604*a-d*, such as the name of an owner of the account, credit card information, country of the owner, etc. The deployment component 622 may receive a configuration from a customer that includes data describing how computing instances 604*a-d* may be configured. For example, the configuration may include an operating system, provide one or more applications to be installed in computing instances 604*a-d*, provide scripts and/or other types of code to be executed for configuring computing instances 604*a-d*, provide cache logic specifying how an application cache should be prepared, and other types of information. The deployment component 622 may utilize the customer-provided configuration and cache logic to configure, prime, and launch computing instances 604*a-d*. The configuration, cache logic, and other information may be specified by a customer accessing the management component 618 or by providing this information directly to the deployment component 622.

Customer account information 624 may include any desired information associated with a customer of the multi-tenant environment. For example, the customer account information may include a unique identifier for a customer, a customer address, billing information, licensing information, customization parameters for launching instances, scheduling information, etc. As described above, the customer account information 624 may also include security information used in encryption of asynchronous responses to API requests. By "asynchronous" it is meant that the API response may be made at any time after the initial request and with a different network connection.

A network 610 may be utilized to interconnect the computing service 600 and the server computers 602*a-d*, 616. The network 610 may be a local area network (LAN) and may be connected to a Wide Area Network (WAN) 612 or the Internet, so that end customers may access the computing service 600. The network topology illustrated in FIG. 6 has been simplified, many more networks and networking devices may be utilized to interconnect the various computing systems disclosed herein.

Figure 7:
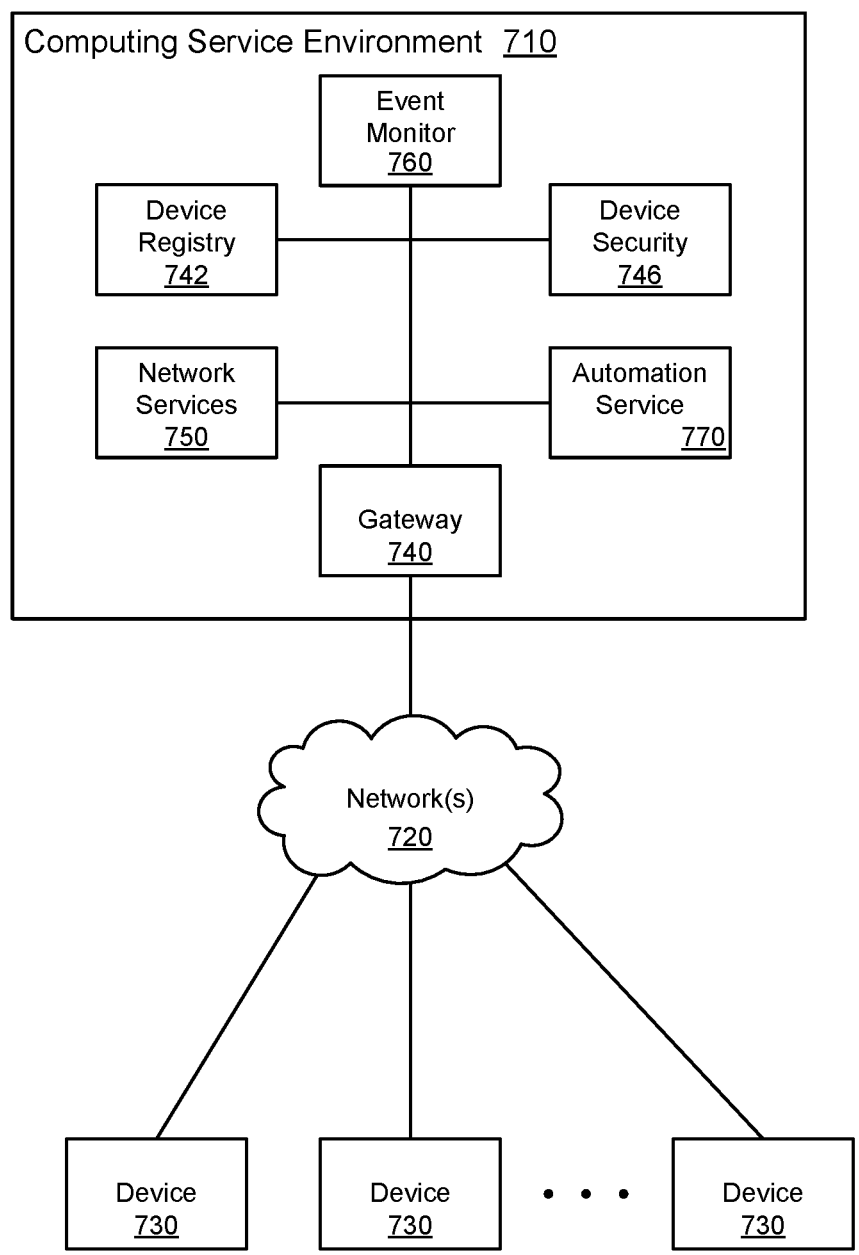
FIG. 7 is a block diagram illustrating an example computer networking architecture for providing network addressable devices access to services via APIs.

FIG. 7 is a diagram illustrating an example computing service environment 710 with which network addressable devices 730 (e.g., IOT devices) may communicate. The computing service environment 710 includes various services that are made accessible via gateway server 740 to the devices 730 that access the gateway server 740 via a network 720. The devices 730 may access the computing service environment 710 in order to access the services such as data storage and computing processing features. The services operating in the computing service environment 710 may communicate data and messages to the devices 730 in response to API requests from devices and/or in response to computing operations within the services. API request loads for the services may be monitored as described earlier and indirectly associated services may be scaled based in part on changes in the API request loads.

The computing service environment 710 comprises communicatively coupled component systems 740, 742, 746, 750 and 770 that operate to provide services to the devices 730. The gateway server 740 may be programmed to provide an interface between the devices 730 and the computing service environment 710. The gateway server 740 receives API requests from the devices 730 and forwards corresponding data and messages to the appropriate systems within the computing service environment 710. Likewise, when systems within the computing service environment 710 attempt to communicate data instructions to the devices 730, the gateway server 740 routes those API requests to the correct device 730.

The gateway server 740 may be adapted to communicate with varied devices 730 using various different computing and communication capabilities. For example, the gateway server 740 may be adapted to communicate using either TCP (Transmission Control Protocol) or UDP (User Datagram Protocol) protocols. Likewise, the gateway server 740 may be programmed to receive and communicate with the devices 730 using any suitable protocol including, for example, MQTT (Message Queue Telemetry Transport), CoAP (Constrained Application Protocol), HTTP (Hyper Text Transport Protocol), and HTTPS (Hyper Text Transport Protocol Secure). The gateway server 740 may be programmed to convert the data and instructions or messages received from the devices 730 into a format that may be used by other of the server systems comprised in the computing service environment 710. In one example, the gateway server 740 may be adapted to convert a message received using the HTTPS protocol into a JSON (JavaScript Object Notation) formatted message that is suitable for communication to other servers within the computing service environment 710.

In one example, the gateway server 740 may communicate via any suitable networking technology with a device registry server 742 that tracks the attributes and capabilities of each device 730, an automation service server 770 specifying rules or logic (e.g., automation rules) for handling various requests that may be received from the devices 730, a device security server 746 that maintains security-related information for the devices 730 that connect to the computing service environment 710, a network services server 750 used by any of servers 740, 742, 746, or 770 to process requests from the devices 730, and an event monitor server 760 that analyzes API request metadata for API requests made within the computing service environment 710 and instructs services to auto scale based in part on the analysis.

Servers 740, 742, 746, 750, and 770 may be communicatively coupled via any suitable networking hardware and software. For example, the servers may communicate via a local area network or wide area network.

The devices 730 may be any devices that may be communicatively coupled via a network 720 with the computing service environment 710. For example, the devices 730 may be computing devices such as smart phones and tablet computers, automobiles, appliances such as washers and driers, industrial sensors, switches, control systems, etc. In one example, each of devices 730 may communicate over the network 720 to store data reflecting the operations of the particular device 730 and/or to request processing provided by, for example, network services server 750. While FIG. 7 depicts three devices 730, it will be appreciated that any number of devices 730 may access the computing service environment 710 via the gateway server 740. Further it will be appreciated that the devices 730 may employ various different communication protocols. For example, some devices 730 may transport data using TCP, while others may communicate data using UDP. Some devices 730 may use MQTT, while others may use CoAP, and still others may use HTTPs. It will also be appreciated that each of devices 730 may be programmed to send and receive particular functions or commands in its requests that are not compatible with other devices or even the systems within computing service environment 710. The gateway server 740 may be programmed to receive and, if needed, attend to converting such requests for processing with the computing service environment 710.

Figure 8:
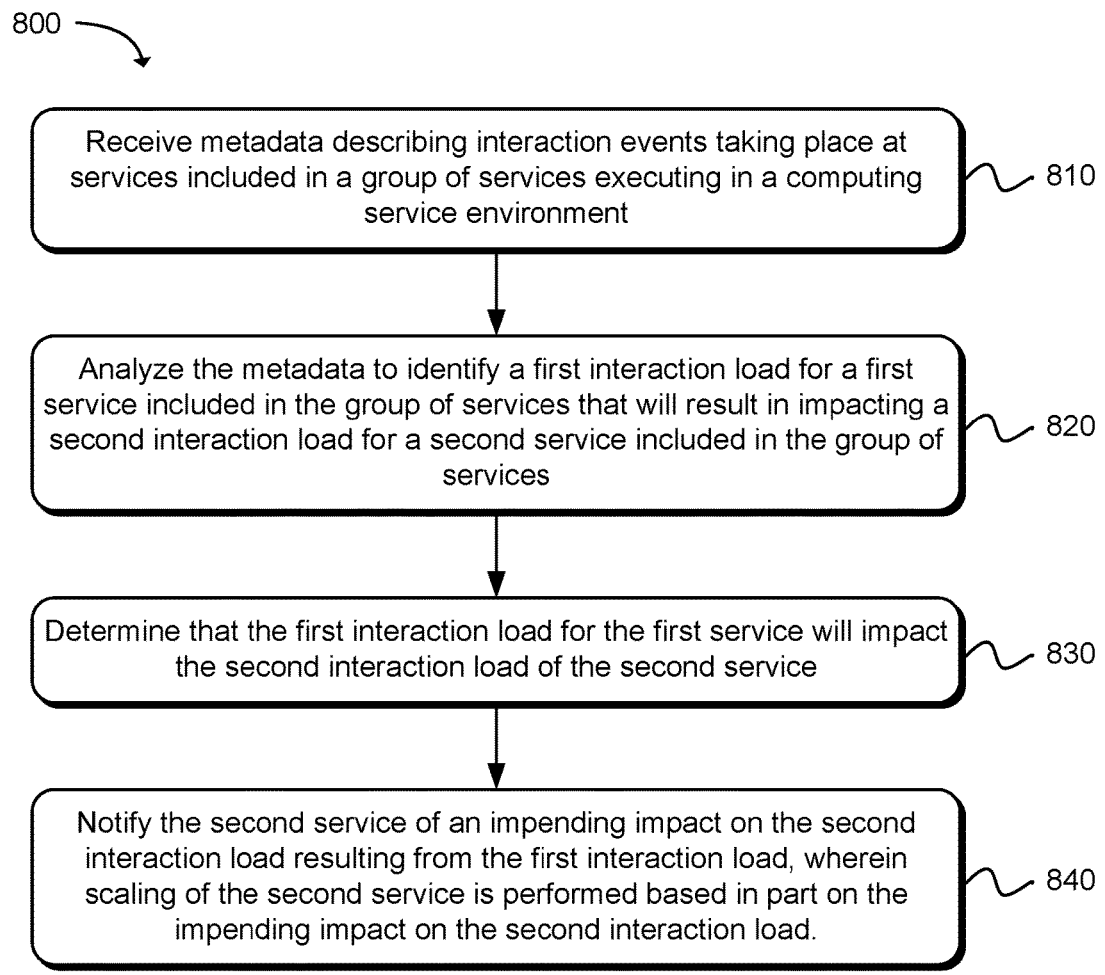
FIG. 8 is a flow diagram that illustrates an example method for monitoring interaction events at a first service and scaling a second service indirectly linked to the first service based in part on the interaction events.

FIG. 8 is a flow diagram illustrating an example method 800 for monitoring interaction events at a first service and scaling a second service indirectly linked to the first service based in part on the interaction events at the first service. In one example, interaction events may include API request events, HTTP (Hypertext Transfer Protocol) request events, remote procedure call events, packet communication events, etc. Starting in block 810, metadata may be received that describes interaction events taking place at services included in a group of services executing in a computing service environment. For example, a service executing in a computing service environment may receive API requests from devices, applications, and/or other services. In receiving an API request, the service may generate metadata describing the API request and provide the metadata to an API event monitor service.

As in block 820, the metadata may be analyzed to identify a first interaction load (e.g., an API request load) for a first service included in the group of services that may result in impacting a second interaction load for a second service included in the group of services. In one example, the event monitor may be configured to analyze the metadata to identify interaction patterns associated with the interaction events and the interaction patterns may be analyzed to determine how the first interaction load for the first service impacts the second interaction load for the second service. In some examples, a machine learning module may be used to identify interaction patterns.

As in block 830, a determination may be made that the first interaction load for the first service may impact the second interaction load of the second service. As in block 840, the second service may be notified of an impending impact on the second interaction load resulting from the first interaction load. In response, the number of second service instances for the second service may be scaled in anticipation of the impending impact on the second interaction load. In one example, the impact of the increased interaction load on the second service may be calculated and the increased interaction load may be used to calculate a number of additional second service instances to launch. For example, the state of the second service may be obtained (e.g., the service may be queried to obtain the number of active second service instances included in the second service) and a number of additional second service instances to launch may be calculated based on the current state of the second service and the impending impact on the second service's interaction load. The number of additional second service instances may then be provided to the second service, and the second service may launch the additional second service instances.

Figure 9:
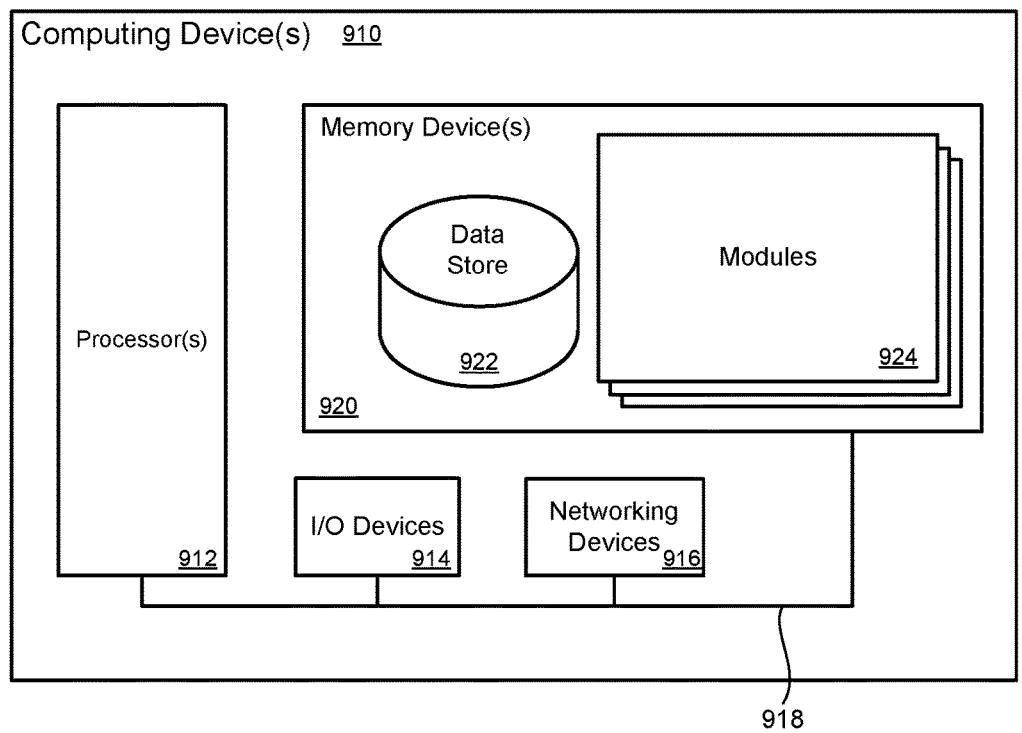
FIG. 9 is block diagram illustrating an example of a computing device that may be used to execute a method for monitoring interaction events and scaling services based in part on the interaction events.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. For example, the memory device 920 may contain a metadata collection module, a metadata analysis module, an API load analysis module, and an auto scale module. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method, comprising:
   receiving metadata describing service requests taking place at services included in a group of services executing in a computing service environment;
   analyzing the metadata to identify a first service request load for a first service that will result in impacting a second service request load for a second service indirectly linked to the first service, wherein the first service and the second service are included in the group of services;
   determining that the first service request load for the first service will impact the second service request load of the second service; and
   notifying the second service of an impending impact on the second service request load resulting from the first service request load, wherein scaling of the second service is performed based in part on the impending impact on the second service request load.

2. A method as in claim 1, further comprising analyzing the metadata to identify indirect relationships among the services formed by the service requests taking place at the services included in the group of services executing in the computing service environment.

3. A method as in claim 1, further comprising:
   analyzing the metadata to identify service requests that form interaction patterns among the services included in the group of services executing in the computing service environment; and
   analyzing the interaction patterns to determine application programming interface (API) request routes and API request loads for the group of services.

4. A method as in claim 3, further comprising constructing a machine learning model using the metadata to identify the interaction patterns associated with the service requests.

5. A method as in claim 3, further comprising analyzing the interaction patterns to determine how the first service request load for the first service impacts the second service request load for the second service.

6. A method as in claim 1, wherein notifying the second service of the impending impact on the second service request load further comprises appending a control instruction to an API request sent from the first service to the second service instructing the second service to scale the second service.

7. A method as in claim 1, wherein the metadata is generated in response to a service request that is received at a service gateway that calls a computing service that executes a function that generates the metadata.

8. A method as in claim 1, wherein the metadata is generated using an agent executing on a computing instance that hosts a service in response to a service request that is received at the service.

9. A method as in claim 1, wherein the metadata describing the service requests includes at least one of: a request identifier, an outbound request identifier, a composite identifier, timing, status, or return value.

10. A method as in claim 1, wherein the services included in the group of services executing in the computing service environment are autonomous services that are interconnected via a computer network accessible by way of a gateway.

11. A method as in claim 10, wherein the computer network is a virtualized computer network.

12. A method as in claim 1, wherein the services included in the group of services executing in the computing service environment are narrowly focused independently deployable micro-services.

13. A method as in claim 1, wherein a service included in the group of services executing in the computing service environment is accessible via a gateway that is specific to the service.

14. A system comprising:
    at least one processor;
    a memory device including instructions that, when executed by the at least one processor, cause the system to:
    receive metadata describing application programming interface (API) service requests taking place at services included in a group of services executing in a computing service environment;
    analyze the metadata to identify a first service request load for a first service that will result in impacting a second service request load for a second service indirectly linked to the first service, wherein the first service and the second service are included in the group of services;
    determine that the first service request load for the first service will impact the second service request load of the second service; and
    notify the second service of an impending impact on the second service request load resulting from the first service request load, wherein scaling of the second service is performed based in part on the impending impact on the second service request load.

15. A system as in claim 14, wherein a service executing in the computing service environment receives an API service request and generates the metadata describing the API service request taking place at the service.

16. A system as in claim 14, wherein the memory device includes instructions that, when executed by the at least one processor, causes the system to further:
    calculate an impact of an increased service request load on the first service; and
    calculate a number of additional second service instances to launch based in part on the calculated impact of the increased service request load.

17. A system as in claim 14, wherein the memory device includes instructions that, when executed by the at least one processor, causes the system to further analyze the metadata to identify API service requests that form interaction patterns, wherein the interaction patterns are used to determine API request routes and API request loads for the group of services.

18. A non-transitory machine readable storage medium having instructions embodied thereon, the instructions when executed by at least one processor:
- receive metadata describing application programming interface (API) service requests taking place at services included in a group of services executing in a computing service environment;
- analyze the metadata to identify a first service request load for a first service included in the group of services that will result in impacting a second service request load for a second service included in the group of services;
- determine that the first service request load for the first service will impact the second service request load of the second service; and
- append a control instruction to an API request sent from the first service to the second service instructing the second service to scale based in part on an impending impact on the second service request load.

19. A non-transitory machine readable storage medium as in claim 18, wherein the instructions that when executed by the at least one processor further analyze request patterns to identify abnormal request patterns that suggest the impending impact on the second service request load.

20. A non-transitory machine readable storage medium as in claim 18, wherein the instructions that when executed by the at least one processor further:
- analyze a request pattern that impacts the first service request load for the first service;
- calculate a scaling factor based in part on the request pattern; and
- provide the scaling factor to the second service.

* * * * *